(12) United States Patent
Jerry

(10) Patent No.: US 6,581,953 B2
(45) Date of Patent: Jun. 24, 2003

(54) TRAILER HITCH ASSEMBLY AND METHOD FOR CONNECTING A TRACTOR VEHICLE AND A TRAILER VEHICLE WITH FORCE DAMPENING CAPABILITIES

(76) Inventor: Smith R. Jerry, 5690 W. Rowland Ave., Littleton, CO (US) 80123

( * ) Notice: Subject to any disclaimer, the term of this patent is extended or adjusted under 35 U.S.C. 154(b) by 0 days.

(21) Appl. No.: 09/925,349

(22) Filed: Aug. 9, 2001

(65) Prior Publication Data

US 2003/0030248 A1 Feb. 13, 2003

(51) Int. Cl.$^7$ ................................................. B60D 1/30
(52) U.S. Cl. ...................... 280/486; 280/483; 280/485; 267/138; D12/162
(58) Field of Search ................................ 280/483–486, 280/511, 515; 267/138; D12/162

(56) References Cited

U.S. PATENT DOCUMENTS

| | | |
|---|---|---|
| 212,768 A | 2/1937 | Johnson |
| 2,287,234 A | 6/1941 | Ducharme |
| 3,345,081 A | 10/1965 | Hartwig |
| 3,708,183 A | 1/1973 | Jones |
| 3,838,778 A * | 10/1974 | Appleton .................. 213/40 R |
| 3,904,226 A | 9/1975 | Smalley |
| 3,990,722 A * | 11/1976 | Casad et al. ................. 267/138 |
| 4,056,155 A | 11/1977 | Wahl |
| 4,148,498 A | 4/1979 | Taylor, Jr. |
| 4,215,876 A | 8/1980 | Jacks |
| 4,351,542 A | 9/1982 | Lovell et al. |
| 4,515,387 A * | 5/1985 | Schuck ........................ 267/138 |
| 4,746,138 A | 5/1988 | James |
| 4,773,668 A | 9/1988 | Muonro |
| 4,817,978 A | 4/1989 | James |
| 4,978,133 A | 12/1990 | Thorne et al. |
| 5,380,030 A | 1/1995 | Gullickson |
| 5,683,094 A | 11/1997 | Gullickson |
| 5,823,560 A | 10/1998 | Van Vleet |
| 5,868,415 A * | 2/1999 | Van Vleet ..................... 280/483 |
| 5,975,553 A * | 11/1999 | Van Vleet ..................... 60/504 |
| 6,068,281 A * | 5/2000 | Szczypski ................ 280/479.2 |
| 6,142,500 A * | 11/2000 | Sargent ................... 280/405.1 |
| 6,494,478 B1 * | 12/2002 | MacKarvich ............... 280/489 |

* cited by examiner

*Primary Examiner*—Lesley D. Morris
*Assistant Examiner*—Daniel Yeagley
(74) *Attorney, Agent, or Firm*—Timothy J. Martin; Michael R. Henson; Rebecca A. Gegick

(57) ABSTRACT

A trailer hitch uses a draw bar to interconnect tractor and trailer vehicles. The draw bar includes an elongated shank with a transverse throughway. A resilient cushion is disposed in the throughway. A passageway is associated with the throughway to receive a hitch pin such that longitudinal motion of the shank is resiliently resisted by the cushion. The cushion may be disposed in a rigid casing to form a cartridge that inserts into the throughway, and the passageway may be provided by a reciprocating slide member in the casing. Cushions may be employed in the casing to resist motion during both braking and acceleration. Cartridges having differing performance may be interchanged in the system. A method employing such structures is described.

29 Claims, 5 Drawing Sheets

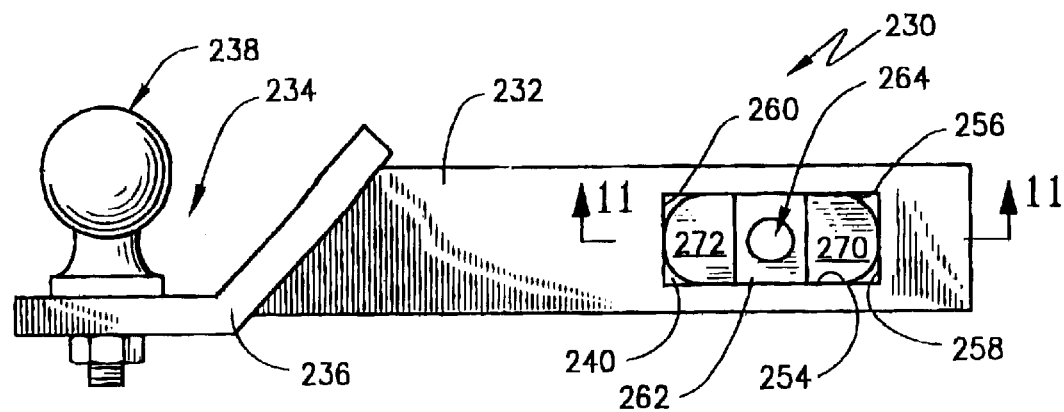
Fig.10
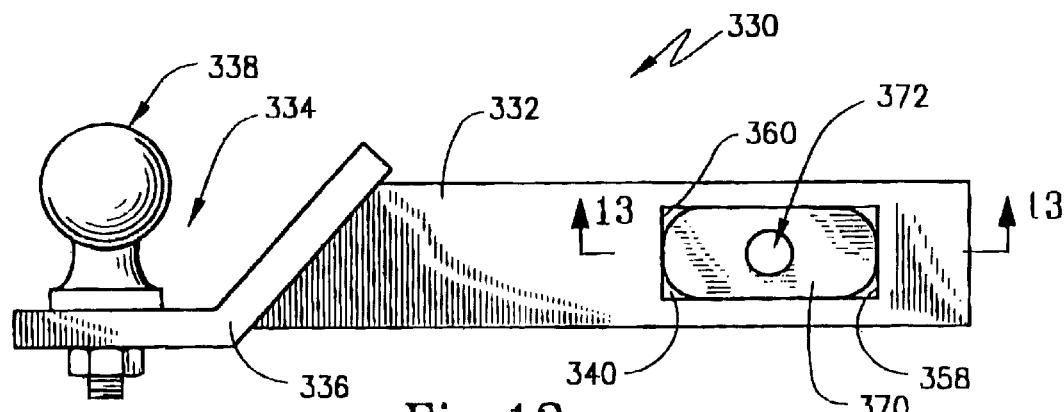
Fig.12
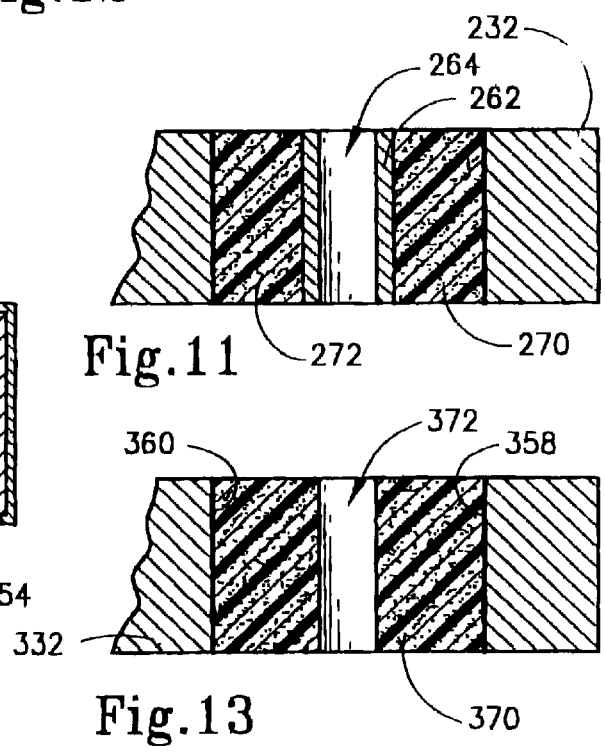
Fig.9g
Fig.11
Fig.13

TRAILER HITCH ASSEMBLY AND METHOD FOR CONNECTING A TRACTOR VEHICLE AND A TRAILER VEHICLE WITH FORCE DAMPENING CAPABILITIES

FIELD OF THE INVENTION

The present invention broadly concerns the interconnection of a tractor vehicle and a trailer vehicle. More particularly, the present invention relates to trailer hitch receivers and draw bars that are attached to a tractor vehicle so that a trailer vehicle may be secured thereto for towing. The present invention specifically relates to a draw bar that is mounted in a standard hitch receiver yet which provides for a cushioning of forces encountered during the towing operation.

BACKGROUND OF THE INVENTION

Since the advent of engine powered vehicles, there has been a recognized use for such a vehicle as a "tractor vehicle" in towing an un-powered or "trailer vehicle". Typically, the tractor vehicle and the trailer vehicle are releasably coupled together by means of a releasable coupling. Such couplings provide matable mechanical structures that may be secured or locked during the towing operation yet may be unsecured or unlocked so that the tractor and trailer vehicles may be separated from one another.

One such coupling that has been used for numerous years includes a ball hitch that is mechanically secured to the frame of the tractor vehicle. The ball hitch includes a spherical ball portion mounted on a shaft. The trailer vehicle is then provided with a tongue that has a ball receiver in the form of a cylindrical cavity sized and adapted to nestably receive the spherical portion of the hitch ball and to be latched thereon while the trailer vehicle is being towed. Hitch balls can be of varying diameters and must be matched with the hitch receiver of the trailer vehicle.

One very popular type of trailer hitch employs a hitch receiver that is affixed to the frame of the vehicle. This hitch receiver is commonly in the form of an elongated hollow, tubular member that is typically of a square-shaped cross-section. The longitudinal axis of this elongated tube is oriented in the direction of travel of the tractor vehicle. A pair of aligned bores are formed in the side wall of the hitch receiver so that a hitch pin may be passed therethrough and clipped or locked into position. A draw bar is provided and is formed as an elongated shank that is adapted to be telescopically received within the interior of the hitch receiver in close-fitted engagement. This shank supports a mounting structure that includes the hitch ball that may be mated with the ball receiver of the trailer. In any event, the shank is provided with a transverse bore of similar size to the bores in the hitch receiver so that, when inserted in a mated state within the hitch receiver, the hitch pin may extend through the bores both of the hitch receiver and of the shank thereby to releasably link them together. With such construction, the user may remove and store the draw bar when the tractor vehicle is not towing a trailer vehicle.

Hitch assemblies of the type described above often have a rigid, metal-to-metal interconnect between the draw bar and the hitch receiver by way of the hitch pin. That is, the hitch pin is in shear between the walls of the hitch receiver and the draw bar. As a result of this rigid interconnect, shock and vibrations result between the trailer vehicle and tractor vehicle. These shocks and vibrations arise from acceleration and braking of the vehicles as well as road surface bumps and vibrations as well as the relative roll of the tractor vehicle and the trailer vehicle rotationally about the axis of travel. As a result, the tractor vehicle is exposed to jerking starts and stops as well as other vibrational forces from the trailer vehicle. Not only can these problems create an unpleasant driving experience, but also can cause wear and tear on the hitch assembly. This in turn, can create a concomitant danger to the driver and passengers of the tractor vehicle as well as to others in the driving environment.

It has been known in the past to address the issue of the rigid interconnect between the tractor and trailer vehicles. For example, For example, U.S. Pat. No. 4,817,978 issued Apr. 4, 1989 to James discloses a trailer hitch assembly of the draw bar type consisting of a receiver tube mounted on the tow vehicle to receive a draw bar tube in vibration dampened retention while extending a hitch ball. The draw bar tube encloses a resilient spring block assembly that is secured to the receiver tube by means of a hitch pin. The hitch pin moves with an elongated slots on the draw bar tube so that vibration from the draw bar tube is damped by the spring block assembly and isolated from the receiver tube and tow vehicle. A shock absorber is also interconnected between the receiver tube and a point on the draw bar tube.

U.S. Pat. No. 4,773,668 issued Sep. 27, 1988 to Muonro discloses a towing hitch that has a housing for receiving a tow bar such that the housing can be pivotally connected to the tow bar. A tongue is coupled to the housing for receiving the towing element, and the housing has a pin which projects into the tow bar. The pin has a resilient block mounted thereon such that the block is arranged between the pin and the tow bar to dampen or absorb shock or vibration transmitted to the towing hitch. The above referenced patents show the use of resilient pieces to dampen vibration between a tractor vehicle and a towing vehicle. In addition to these patents, other patents have described tow hitch assemblies to dampen various motions. These include:

| U.S. Pat. No. | Inventor | Issue Date |
| --- | --- | --- |
| 2,127,689 | Johnson | Aug. 23, 1938 |
| 2,287,234 | Ducharme | Jun. 23, 1942 |
| 3,345,081 | Hartwig | Oct. 3, 1967 |
| 3,708,183 | Jones | Jan. 2, 1973 |
| 3,904,226 | Smalley | Sep. 9, 1975 |
| 4,148,498 | Tailor, Jr. | Apr. 10, 1979 |
| 4,215,876 | Jacks | Aug. 5, 1980 |
| 4,351,542 | Lovell et al | Sep. 28, 1982 |
| 4,978,133 | Thorne et al | Dec. 18, 1990 |
| 5,380,030 | Gullickson | Jan. 10, 1995 |
| 5,683,094 | Guillickson | Nov. 4, 1997 |

In U.S. Pat. No. 5,823,560 issued Oct. 20, 1998 to Van Vleet, a trailer hitch apparatus is shown that includes dampening mechanisms to simultaneously dampen vibration and shock in a longitudinal direction and a vertical direction. The apparatus included a hollow draw bar tube capable of being removably coupled to a hitch receiver of a tractor vehicle. The draw bar tube is movably longitudinally relative to the receiving tube while secured therein by means of a hitch pin. The hitch pin extended through a slide block movably disposed in the hollow draw bar, and dampening cushions were placed on either side of this slide block so as to cushion its longitudinal movement. Thus, the hitch pin was rigidly mounted to the slide block which in turn was resiliently biased within the draw bar. These cushions, then, dampened longitudinal movement both during acceleration and deceleration of the tractor vehicle and the trailer vehicle.

While the structures shown in U.S. Pat. No. 5,823,560 provided a substantial improvement over previous dampening mechanisms, there remains a need for increasingly better systems that can accept and attenuate the relative forces between the tractor vehicle and the trailer vehicle that are caused by acceleration, deceleration and the other force causing conditions noted above. There is a further need for trailer hitch receivers and draw bars that have dampening mechanisms that are easy to assembly and use. There is a further need for such systems that can provide a variety of cushioning systems that can be customized to different load conditions between the tractor and trailer vehicle. The present invention, in its various embodiments, addresses these issues.

SUMMARY OF THE INVENTION

It is an object of the present invention to provide a new and useful trailer hitch assembly adapted to interconnect a tractor vehicle and a trailer vehicle.

It is a further object of the present invention to provide a new and useful draw bar that is adapted to mate with a hitch receiver and a combination draw bar and hitch receiver wherein the draw bar is cushioned with respect to longitudinal forces.

It is yet another object of the present invention to provide a new and useful method of hitching a trailer to a tractor vehicle.

A still further object of the present invention is to provide a hitch assembly that cushions one or more of the forces occuring during the interaction between a trailer vehicle and a tractor vehicle.

Yet a further object of the present invention is to provide a method and apparatus for hitching a trailer vehicle to a tractor vehicle, if desired, can be modified to accommodate different loads between the vehicles.

Accordingly, to the present invention, then, a draw bar and a trailer hitch incorporating such a draw bar is provided. Broadly, the draw bar includes an elongated shank that has a longitudinal axis and that has a transverse throughway extending therethrough. The throughway has parameter wall portions, and a resilient cushion member is movably disposed in the throughway and is supported against the parameter wall portions of the throughway. A passageway is associated with cushion member and is sized to receive a hitch pin such that when in the mated state, longitudinal motion of the shank in the hitch receivers resisted by the cushion member with resilient force. When used in a hitch assembly, a hitch receiver is provided that is adapted to be secured to the tractor vehicle. Here, the hitch receiver defines a longitudinally extending cavity and includes a pair of receiver side walls. A bore is formed in each of these side walls with the bore being sized for close-fitted engagement by the hitch pin when in the mated state. These bores are thus axially aligned so that, when the draw bar is inserted within the hitch receiver, the hitch pin can extend through the bores and through the passageway that is associated with the cushion member thereby to secure the draw bar in the hitch receiver.

The draw bar has a shank that can be formed either as a hollow tubular member or as a solid piece. When the shank is formed as a hollow tubular member, the throughway is defined by a pair of opposed openings. Each of these openings has a first edge portion and a second edge portion that define at least some of the parameter wall portions that support the resilient cushion member. When the shank is solid, the throughway has first and second side wall portions oriented transversely of the shank with these side wall portions then supporting the cushion member.

While the cushion member may be directly supported by the parameter wall portions, either in the form of the edges of the hollow tubular shank or the side wall portions of the solid shank, the present invention contemplates the indirect support of the cushion members by means of a cartridge. Here, the cartridge is formed by a rigid casing that is sized and adapted to be received in the throughway. The casing is then supported against movement in the shank by the first and second side wall portions or edges of the shank. The resilient cushion member is received in the casing and is supported thereby.

In a more detailed form of the present invention, a slide member is disposed in the throughway and, preferably, in the cartridge casing so that it is reciprocally moveable therein in a longitudinal direction. The slide member has a transversely extending bore that is sized and adapted to receive the hitch pin when in the mated state. The cushion member is disposed between the slide member and one of the first and second end wall portions of the opening in the casing.

In order to cushion both acceleration and braking forces between a tractor and a trailer vehicle, it is desired that a pair of cushion members be disposed in the cartridge or within the throughway. Here, there is a cushion member on each side of slide member so that the slide member is resiliently supported for longitudinal movement in opposite directions against opposite forces.

If desired, the cushion members can have different resiliency characteristics. Different resiliency can result from the formation of the first and second cushion members out of different materials. Alternatively, the resiliency can be differed by providing the first and second cushion members with different geometric shapes. Further, the difference in resiliency characteristics can be provided by constructing the cushion members differently.

In order to accommodate different use demands, a draw bar according to the present invention can employ a system of interchangeable cartridges that are each adapted to be disposed in the throughway and supported from movement thereagainst. At least a plurality of such cartridges would include a casing in the form of a rigid sleeve having an axis oriented transversely to the longitudinal direction with at least one resilient cushion member disposed in the casing. At least some of these cartridges would then have cushions of different resiliency characteristics. Thus, for example, one could provide a difference in resiliency between a braking force and an acceleration force as desired. This would also accommodate cushioning of different load forces when the trailer vehicle is loaded either heavy or lighter. In any event, it is desirable that the draw bar be provided with a hitch ball secured to the shank.

Finally, the present invention includes a method of hitching a trailer to the tractor vehicle. Here, the method includes any of the steps that are accomplished by the structure summarized above. In its broad form, the method includes the placing of a hitch receiver on a tractor vehicle with this hitch receiver defining a longitudinally extending cavity. Here, the hitch receiver again includes a pair of side wall each having a bore sized for close-fitted engagement by a hitch pin when in the mated state with these bores being transversely aligned. The method also includes the step of providing a draw bar that includes an elongated shank having a longitudinal axis in a transversely extending throughway. The method then includes the step of providing at least one cartridge that is adapted to be disposed in the opening and supported against movement therein. The method then includes the step of interconnecting the hitch receiver and the draw bar with the hitch pin in such a manner that the hitch pin is resiliently cushioned relative to said cartridge. Finally, the broad method includes the attachment of a tongue of the trailer to the draw bar.

Additional steps to the method can include the step of providing a plurality of cartridges that are interchangeable within the throughway. Some of these cartridges may have cushioning elements that are of different resiliency characteristics as described above.

These and other objects of the present invention will become more readily appreciated and understood from a consideration of the following detailed description of the exemplary embodiment of the present invention when taken together with the accompanying drawings, in which:

BRIEF DESCRIPTION OF THE DRAWINGS

FIGS. 9(a)–9(g) showing alternative exemplary embodiments of the cartridge according to the present invention;

FIG. 10 is a side view in elevation showing a second exemplary embodiment of a draw bar according to the present invention;

FIG. 11 is a cross-sectional view taken about lines 11—11 of FIG. 10;

FIG. 12 is a side view in elevation showing a third exemplary embodiment of the draw bar according to the present invention; and FIG. 13 is a cross-sectional view taken about lines 13—13 of FIG. 12.

DETAILED DESCRIPTION OF THE EXEMPLARY EMBODIMENTS

The present invention is broadly directed to a trailer hitch assembly that employs a traditional trailer hitch receiver and a draw bar that is provided with at least one resilient cushion member that is operative to dampen force in at least longitudinal vector, namely, acceleration or deceleration. A hitch pin interconnects this draw bar to the traditional hitch receiver. The present invention is also directed to a method of hitching a trailer to a tractor vehicle employing such a trailer hitch.

Figure 1:
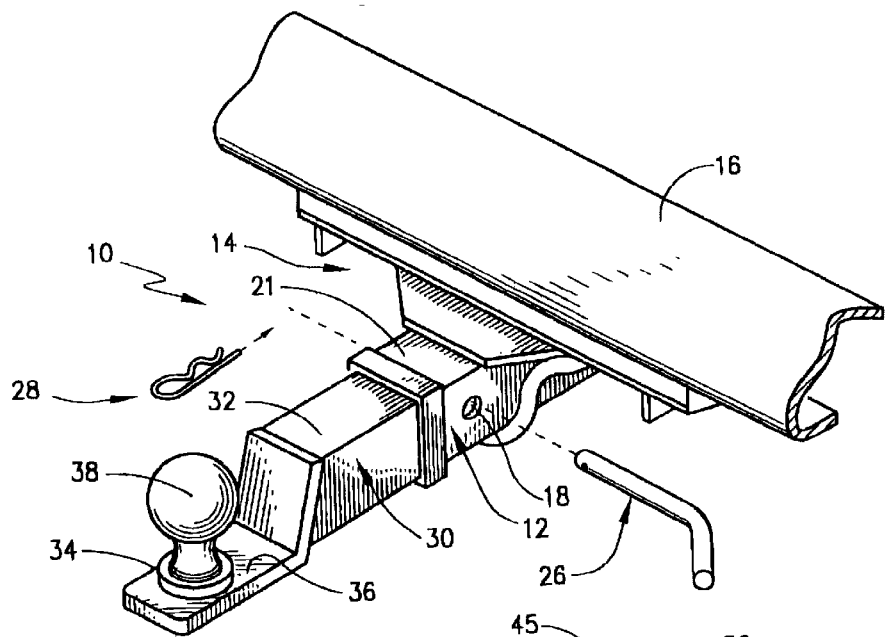
FIG. 1 is a perspective view of a trailer hitch having a hitch receiver and draw bar according to a first exemplary embodiment of the present invention.

A first exemplary embodiment of the trailer hitch 10 according to the present invention is introduced in FIG. 1. Here, it may be seen that trailer hitch 10 includes a hitch receiver 12 having a mounting bracket assembly 14 that is secured to a frame piece 16 of a tractor vehicle. Hitch receiver 12 matably receives an elongated shank 32 of a draw bar 30 with a shank 32 being telescopically received in hitch receiver 12 in a longitudinal direction. Shank 32 may be held in position by means of a hitch pin 26 that extends through a pair of transversely aligned bores, such as representative bore 18 and through a passageway (not shown in FIG. 1) in shank portion 32. Hitch pin 26 is held in position by means of a suitable clip 28 as is known in the art. Draw bar 30 has a hitch ball assembly 34 affixed to the end of shank 32 opposite hitch receiver 12 with hitch ball assembly 34 including a bracket 36 that supports a hitch ball 38 that may receive the hitch ball receiver of the tongue of a trailer vehicle.

Figure 2:
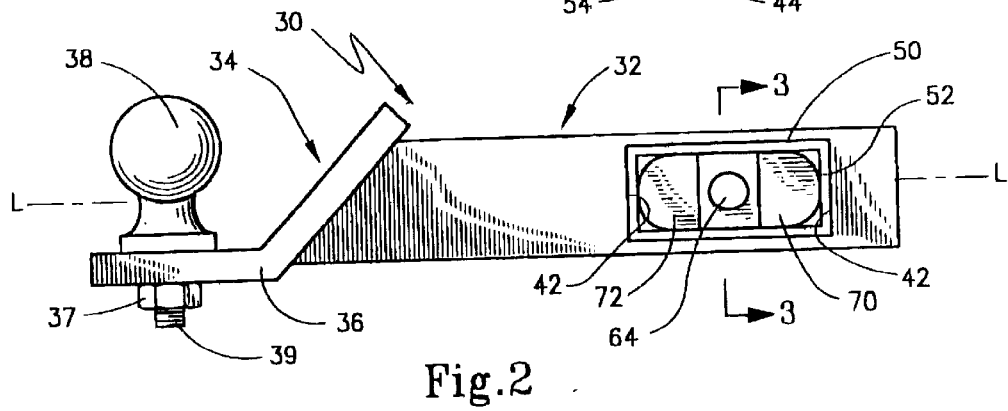
FIG. 2 is a side view in elevation of the draw bar of FIG. 1.
Figure 4:
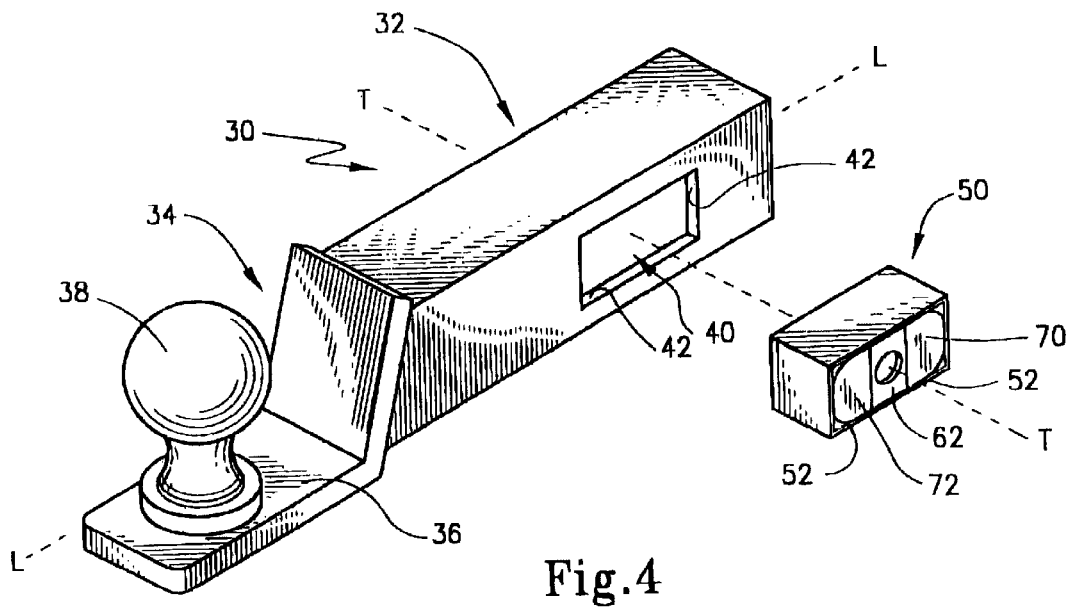
FIG. 4 is a perspective view, partially exploded, showing the insertion of a cartridge with cushion members according to the first exemplary embodiment of the present invention.
Figure 5:
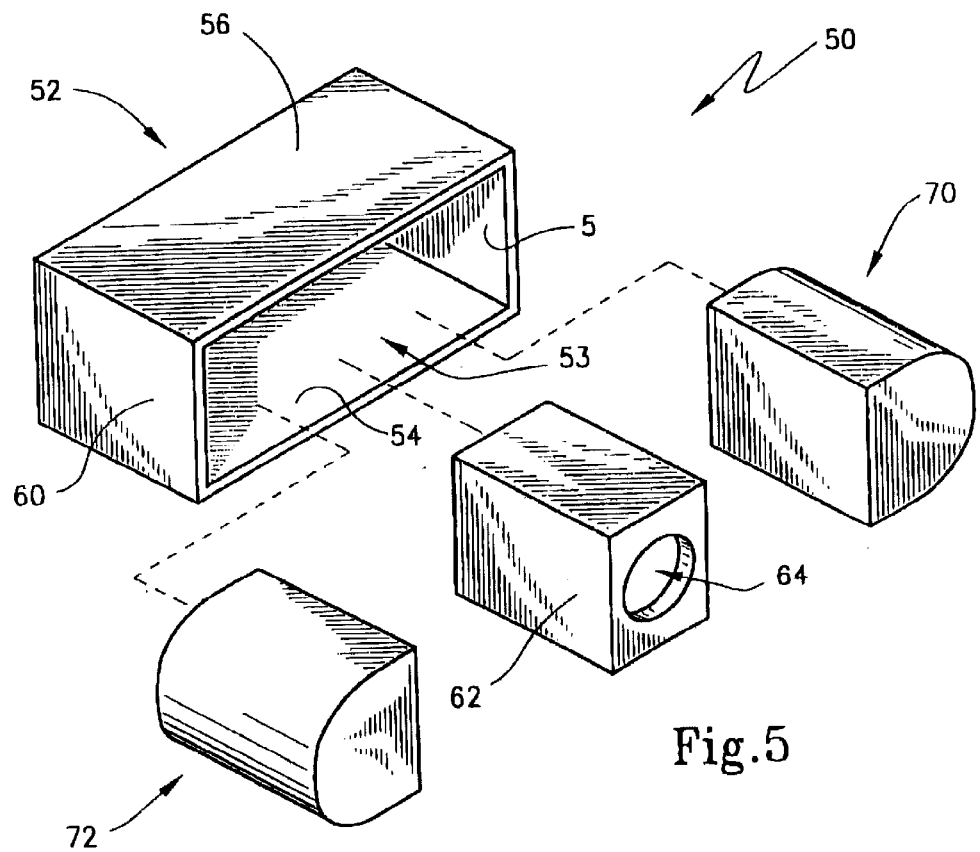
FIG. 5 is an exploded perspective view of the cushion cartridge of FIG. 4.

Much of the structure of the trailer hitch 10 shown in FIG. 1 is similar to that known in the art. However, trailer hitch 10 employs a new and useful draw bar 30 according to the present invention that is illustrated in FIGS. 2 and 4. In FIGS. 2 and 4, then, it may be seen that draw bar 30 has a longitudinal axis "L" and a throughway 40 extending transversely through shank 32. In FIGS. 2 and 4, it may be seen that throughway 40 receives a cartridge 50 that has a rigid casing 52 that is fitted in perimeter wall portions of shank 32 such as perimeter wall portion 42 shown in these Figures. In the embodiment of draw bar 30 shown in FIGS. 2 and 4, elongated shank 32 has a hollow interior and is formed as a tubular piece of steel of square-shaped cross-section. Hitch ball assembly 34 is then welded to shank 32 with bracket 36 mounting hitch ball 38 in the standard manner such as by means of a nut 37 received on shank 39.

Cartridge 50 is illustrated in FIGS. 2–5 where it may be seen that casing 52 is in the form of a hollow rectangular rigid box having a lower wall 54, an upper wall 56 and a pair of end walls 58, 60. A rigid slide member 62 is slideably received in the interior 53 of casing 52 with slide member 62 preferably being formed of a suitable metal, such as steel, aluminum or the like. Slide member 62 has a passageway formed therethrough in the form of a bore 64 that is adapted to receive hitch pin 26. A pair of cushion elements 70 and 72 are interposed between slide member 62 and a respective end wall 58 and 60 of casing 52. If desired, cushion elements 70 and 72 can be pre-compressed as part of their interposition between slide member 62 and the respective end wall 58 and 60 of casing 52. Pre-compression increases the forces necessary for additional compression during the respective acceleration and deceleration relatively between the tractor and trailer vehicles. The ordinarily skilled artisan will appreciate that the amount of pre-compression can be used to selectively vary the performance characteristics of cushion elements 70 and 72.

Figure 3:
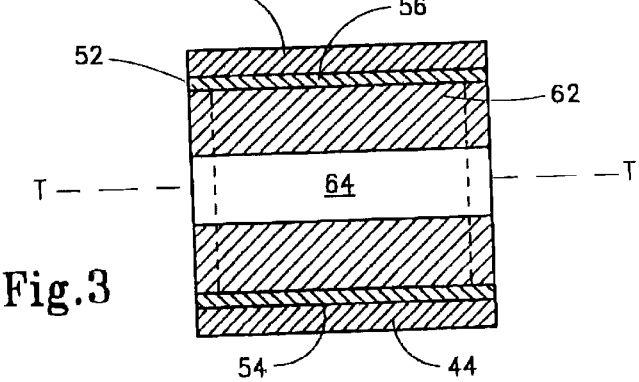
FIG. 3 is a cross-sectional view taken about lines 3—3 of FIG. 2.
Figure 6:
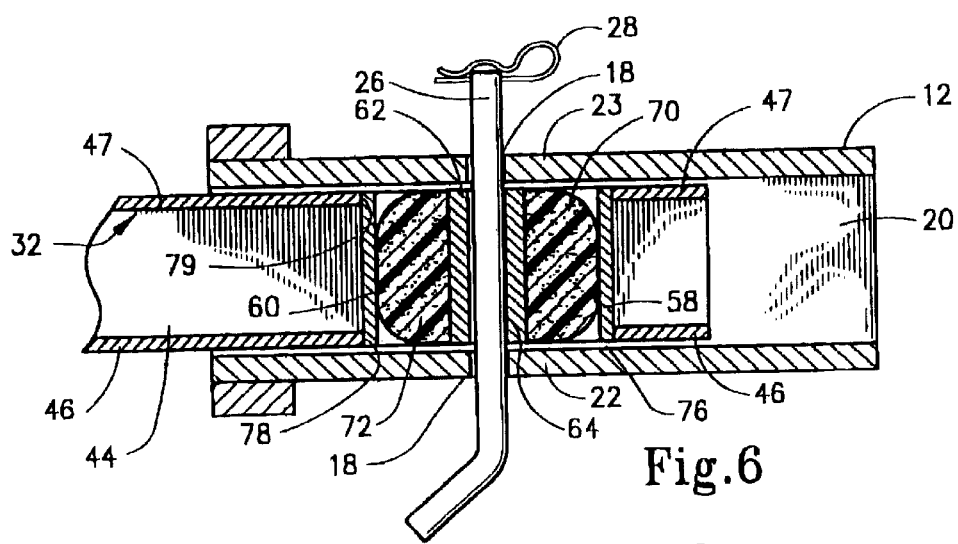
FIG. 6 is a top view in partial cross-section showing the mounting of the draw bar of FIGS. 2–4 in the hitch receiver of FIG. 1 in an intermediate, "at rest" state.

Turning now to FIGS. 3 and 6, it may be understood that shank 32 has a bottom wall 44, a top wall 45, and a pair of side walls 46 and 47. Hitch receiver, as illustrated in FIGS. 1 and 6, has a bottom wall 20, a top wall 21 and a pair of side walls 22 and 23. With reference again to FIGS. 3 and 6, it may be seen that end wall 58 of casing 52 is rigidly supported by edges 76 and 77 formed by side walls 46 and 47, respectively, by throughway 40. Likewise, end wall 60 of casing 52 is supported against edges 78 and 79 of side walls 46 and 47 respectively formed by throughway 40 therethrough. Accordingly, edges 76–79 form a parameter wall portion 42 for throughway 40 with casing 52 being rigidly supported in a throughway.

With reference still to FIG. 6, it may be seen that, when shank 32 of draw bar 30 is mounted in hitch receiver 12, hitch pin 26 extends transversely through transverse bore 64 of slide member 62 and openings 18 in side walls 22 and 23. Accordingly, slide member 62 is retained against movement relative to hitch receiver 12 by means of hitch pin 26. Likewise, casing 52 is supported against movement relative to shank 32 by confronting edges 76–79. However, slide member 62 may move relative to casing 52 and therefore shank 32 against the resilient biasing forces of cushion elements 70 and 72.

Figure 7:
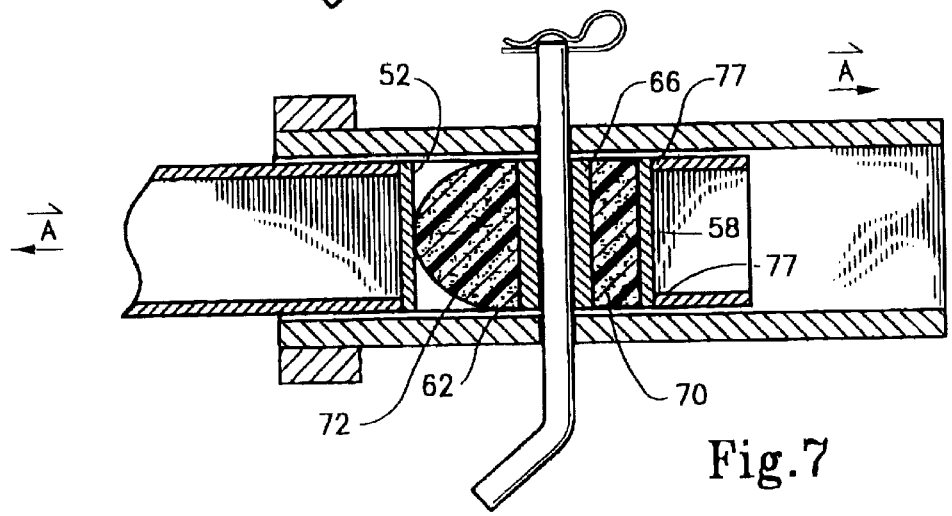
FIG. 7 is a top view in partial cross-section, similar to FIG. 6, showing the draw bar and hitch receiver in a second state corresponding to the braking of the tractor vehicle.

Thus, for example, with reference to FIG. 7, when the tractor vehicle accelerates, a force is created which acts against the inertia of the trailer vehicle so that shank portion 32 and receiver 12 tend to move apart. Instead of rigidly resisting this motion, as is in the case of a typical trailer hitch assembly, this force of separation is resisted by the resiliency of cushion element 70 since slide bracket 62 moves forwardly in casing 52 so that cushion element 70 is compressed against flat face 66 of slide bracket 62 and end wall 58 of casing 52 that is supported against edges 76 and 77. Cushion element 72 can expand, if it is pre-compressed in the intermediate, at rest state shown in FIG. 6.

Figure 8:
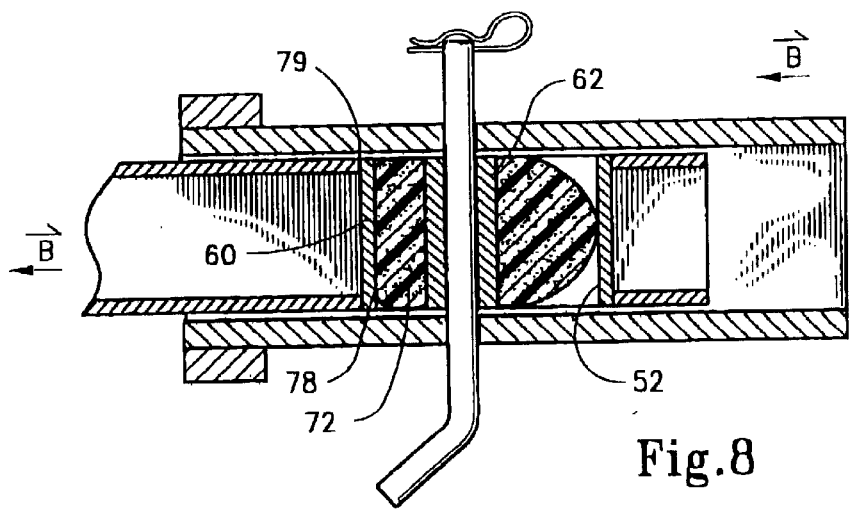
FIG. 8 is a top view in partial cross-section, similar to FIGS. 6 and 7, showing the draw bar and hitch receiver in a mated state and wherein the tractor vehicle is accelerating.

Correspondingly, as is shown in FIG. 8, when the tractor vehicle brakes, a force vector "b" acts against the momentum of the trailer vehicle. When this occurs, slide member 62 moves rearwardly in casing 52 against cushion 72 to compress cushion 72 against end wall 60 of casing 52 that is rigidly supported against edges 78 and 79 of side walls 46 and 47 of shank 32. When this occurs, cushion element 70 may expand.

From the foregoing, it may be appreciated that during the construction, materials, geometrical configuration and other parameters with respect to cushion elements 70 and 72 can alter the response characteristic of the cushioning in one or both of the acceleration and braking modes. For example, if a heavier load is to be hauled by the tractor vehicle, resilient cushion elements having a greater spring constant may be desired. Likewise, the user may desire that the resilient force supplied by the tow bar 30 be greater in the braking mode than in the acceleration mode. In addition, the user may desire to have a non-linear response to either the acceleration or the braking modes. That is, the user may desire that the cushioning elements provide a reduced force at the beginning of either the braking or acceleration, followed by an increasing force that is at a rate greater than linear.

Figure 9A:
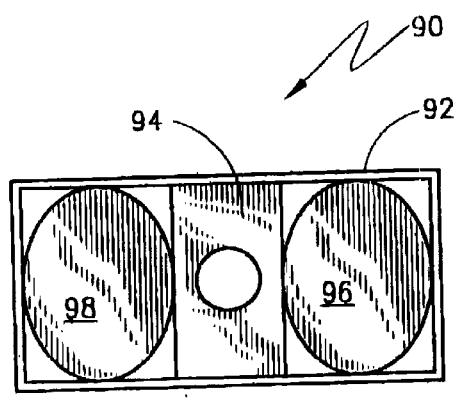

Accordingly, a variety of cushioning elements are shown in FIGS. 9(a)–9(f). In FIG. 9(a), a cartridge 90 is shown with a slide member 94 received in a casing 92 and a pair of cushion elements 96 and 98 are provided between slide member 94 and the end walls of casing 92. Cushion elements 96 and 98 have oval cross-sections and may be pre-compressed upon insertion in the casing 92. Assuming that cushion elements 96 and 98 are formed of the same material as cushion elements 70 and 76, and depending on the amount of pre-compression, cushion elements 94 and 96 will provide a smaller resilient force over a greater distance than cushions 70 and 72.

Figure 9B:
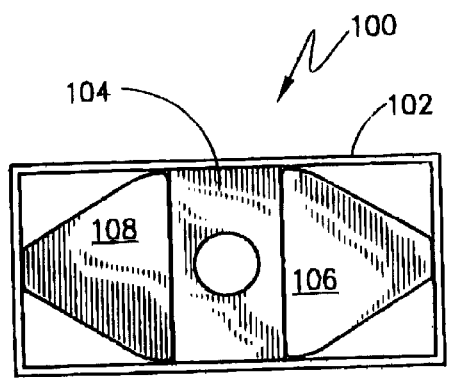

In FIG. 9(b), cushion elements 106 and 108 are positioned between the end walls of casing 102 of cartridge 100 so that they are between the end walls of casing 102 and slide member 104. Cushion elements 106 and 108 have triangular cross-sections with truncated tips that bear against the end wall. Due to the different geometrical configuration, a different force curve would result in the compression of either of cushion elements 106 and 108 in the acceleration and braking modes.

Figure 9C:
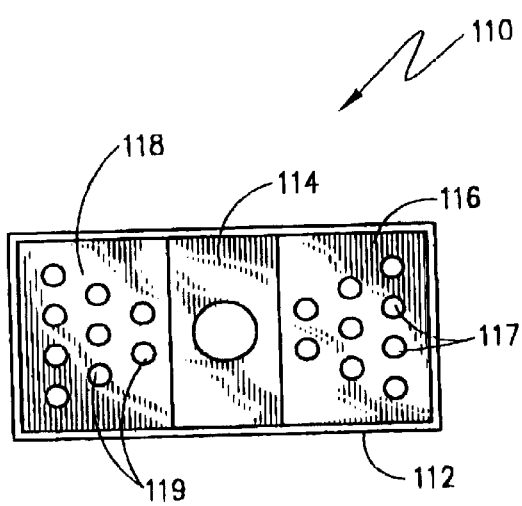

In FIG. 9(c), cartridge 110 is provided with cushion elements 116 and 118. Cushion elements 116 and 118 are interposed between the end walls of casing 112 and slide member 114. Here, cushion element 116 is provided with a plurality of voids 117 while cushion element 118 is provided with a plurality of voids 119. The presence of voids 117 and 119 again alter, by way of their construction, the response forces of cushions 116 and 118 to the braking and deceleration of tractor and trailer vehicles.

Figure 9D:
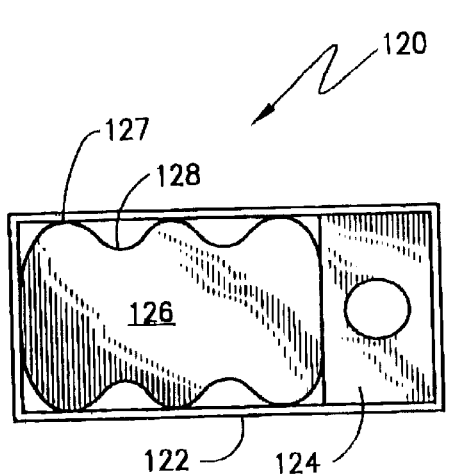
Figure 9E:
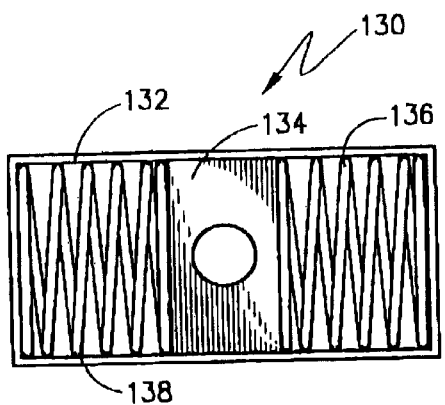

An alternative cartridge 120 is shown in FIG. 9(d). Here, only a single cushion element 126 is shown located on one side of slide member 124 in casing 122 of cartridge 120. In this configuration, depending on the orientation of cartridge 120 in the throughway 40, a resilient biasing would occur in only one of the acceleration or braking modes while the other of the acceleration and braking modes would respond rigidly without the effect of a cushion element. Cushion element 126 is formed to have a plurality of alternating ribs 127 and channels 128. These again will effect the response of cushion element 126 in either the braking or acceleration mode, as selected.

While the embodiments of cartridges 50, 90, 100, 110 and 120, above have used cushion elements made of a resilient polymer, it is possible that the resilient elements be formed by springs or other resilient biasing members. Thus, for example, as is shown for illustrative purposes only in FIG. 9(e), cartridge 130 includes a casing 132 and a slide bracket 134. A first coil spring 136 is interposed between slide bracket 135 and a first end wall of casing 132 while a second coil spring 138 is interposed between slide member 134 and the other end wall of casing 132. Here, again, the particular construction of springs 136 and 138 as well as their spring constance will effect the performance characteristics during braking and deceleration modes of the tractor vehicle and trailer vehicle.

Figure 9F:
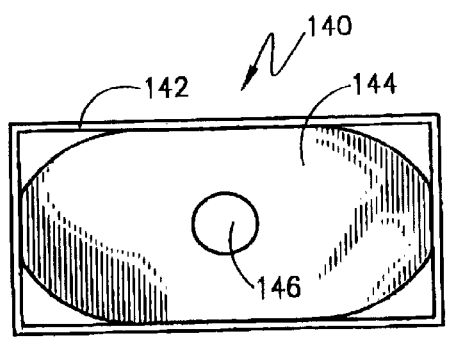

FIG. 9(f) illustrates yet another embodiment wherein a cartridge 140 is provided with casing 142. Here, however, slide bracket 134 is eliminated in favor of a single cushion element 144 that fills the interior of casing 142. Cushion 144 has a transverse bore 146 formed therethrough to receive hitch pin 26. Cushion 144 will provide resilient cushioning in both the acceleration and deceleration modes. Here, however, it is important that the material used in the construction of cushion element 144 be sufficiently durable to withstand the wear and tear of directly receiving the hitch pin without wearing, tearing or other degrading that would defeat its performance.

Should the owner of a vehicle desire to rigidly connect the draw bar and the hitch receiver, a rigid interconnect cartridge 150 could be employed. Here, as is shown in FIG. 9(g), a cartridge 150 includes a casing 152 and a metallic insert 154 is received in the interior thereof. Insert 154 has a transverse bore 156 extending therethrough to receive hitch pin 26. By providing metallic bar 154, no cushioning is provided and the draw bar will become rigidly interlocked with hitch receiver 12.

From the foregoing, it may be understood that the draw bar according to the present invention contemplates the inclusion of a plurality of interchangeable cartridges that are adapted to be disposed in the throughway of the elongated shank and supported against movement therein. Each cartridge includes a casing in the form of rigid sleeve having an axis oriented transversely to the longitudinal direction. At least one resilient cushion member is disposed in each of these plurality of cartridges, and a passageway is associated with each cushion member in order to receiver the hitch pin therethrough.

An alternative embodiment of the draw bar according to the present invention is shown in FIGS. 10 and 11. Here, draw bar 230 includes an elongated shank 232 provided with a hitch ball assembly 234 at one end thereof. Hitch ball assembly 234 includes a bracket 236 that supports a hitch ball 238 in a manner known in the art. As shown in FIG. 11, elongated shank 232 is formed as a solid metal piece having a transverse throughway 240 extending therethrough. Throughway 240 thus has a lower wall 254, an upper wall 256, an end wall 258 and a second end wall 260. A slide member 262 is received in the interior of throughway 240 and a pair of cushion elements 270 and 272 are positioned between slide member 262 and a respective end wall 258 and 260.

Draw bar 230 is substantially identical, then, to draw bar 30 with the exception that shank 232 is formed as a solid piece instead of a square-shaped tubular member. When this occurs, another difference can be optionally employed. Namely, if desired, the cartridge 50 including casing 52 may be eliminated since sufficient support is provided for supporting cushions 270 and 272 directly against the end walls in a solid shank thus eliminating the need for end walls 50 and 60 provided by casing 52 with these walls, in turn, being supported by the parameter wall portion formed by the edges 76–79 of throughway 40. Any cushion and slide member array selected by the user could be employed, based on the teachings with respect to cartridges 50, 90, 100, 110, 120, 130, 140 and 150, above. Of course, if desired, cartridges could still be employed with the embodiment shown in FIGS. 10 and 11.

A third exemplary embodiment of the draw bar of the present invention is shown in FIGS. 12 and 13. Here, draw bar 330 includes a elongated shank 332 again formed of a solid metallic piece with a throughway 340 formed transversely therein. Shank 332 again supports a hitch ball assembly 334 that includes a bracket 336 and a hitch ball 338 similar to draw bars 30 and 230. Here, slide bracket 264 is eliminated and is replaced by a single cushion element 270 that has a transverse bore 272 formed therein. Cushion element 270 is directly supported by end walls 258 and 260. This construction is similar to cartridge 140, discussed above, but eliminates the casing 142 in favor of directly inserting cushion element 370 in throughway 340.

From the foregoing, it should be understood, then, that reference in claims to a resilient cushion member being "supported against parameter wall portions of the throughway" for example, means that the cushion may either be directly supported against the wall of the throughway or directly supported by means of a plate-like piece generally provided by the end walls of the casing of the cartridge. The parameter wall portion of the throughway, then, can be provided by the edges of the tubular shank or by solid walls where the shank is formed of a solid piece of material. Moreover, while it is preferred that the axis of the throughways be oriented perpendicularly to the longitudinal axis of the shank portion, it should be understood that transverse does not require strict perpendicularity, but also includes the orientation of the throughway at an oblique angle with respect to the longitudinal axis. The position, however, of the cartridge is convenient since a set of cartridges may be provided to a customer and the customer need only replace cartridges to obtain different desired performance characteristics. The cushion elements in these cartridges can be pre-loaded, as desired, so that the customer does not have to trouble himself/herself with piecing together of the cushion elements and slide members.

Moreover, it should be understood that the present invention contemplates a method of hitching a trailer to a tractor vehicle that comprises the steps inherent in the structures described above. In its broad form, this method includes the placing of a hitch receiver on the tractor vehicle when the hitch receiver defines a longitudinally extending cavity and includes a pair of side walls each having a bore sized for close-fitted engagement by a hitch pin when in a mated state. These bores, of course, are transversely aligned with one another. The method then includes the step of providing a draw bar that has an elongated shank with a longitudinal axis and a transversely extending throughway therethrough. At least one cartridge is provided with the cartridge being adapted to be disposed in the opening and supported against movement therein. The method then includes the step of interconnecting the hitch receiver and the draw bar with a hitch pin in such a manner that the hitch pin is resiliently cushioned relative to the cartridge. Finally, the method includes the step of attaching the tongue of the trailer to the draw bar. The method can include the step of cushioning the hitch pin in opposite longitudinal directions corresponding to acceleration and braking relatively between the tractor and trailer vehicle. The method can also include the steps of interchanging cartridges within the draw bar so as to obtain different performance characteristics for the cushioning forces.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

I claim:

1. A draw bar adapted to mate with a hitch receiver and be secured therein by means of a hitch pin in a mated state, comprising:

(a) an elongated shank formed as a hollow tubular member and having a longitudinal axis and a transversely extending throughway extending therethrough with the throughway having a perimeter wall portion, said throughway being defined by a pair of opposed axially aligned openings each having a first edge portion and a second edge portion with said first and second edge portions defining at least some of said perimeter wall portion;

(b) a resilient cushion member disposed in the throughway and supported against the perimeter wall portion of the throughway; and (c) a passageway associated with said cushion member and sized to receive said hitch pin therethrough such that, when in the mated state, longitudinal motion of said shank in said hitch receiver is resisted by said cushion member with a resilient force.

2. A draw bar according to claim 1 including a hitch ball secured to said shank.

3. A draw bar adapted to mate with a hitch receiver and be secured therein by means of a hitch pin in a mated state, comprising:

(a) an elongated shank having a longitudinal axis and formed as a hollow tubular member, said shank having a transversely extending throughway extending therethrough with the throughway having a perimeter wall portion, said throughway formed by a pair of opposed axially aligned openings each having a first edge portion and a second edge portion that defining at least some of said perimeter wall portion;

(b) a rigid casing sized and adapted to be received in the throughway, said casing supported against movement in said shank by the first and second edge portions;

(c) a resilient cushion member disposed in said casing and supported thereby; and (d) a passageway associated with said cushion member and sized to receive said hitch pin therethrough such that, when in the mated state, longitudinal motion of said shank in said hitch receiver is resisted by said cushion member with a resilient force.

4. A draw bar according to claim 3 including:

(a) a slide member disposed in said casing and reciprocally movably therein in the longitudinal direction,
   (1) said slide member having a transversely extending bore therethrough to define said passageway, the bore being sized and adapted to receive said hitch pin when in the mated state, and (b) wherein said casing includes transversely oriented first and second side walls,
   (1) said first and second side walls extending across the interior of said shank in longitudinally spaced relation to one another, and (c) said cushion member disposed between said slide member and one of said first and second side walls.

5. A draw bar according to claim 4 including a pair of cushion members, one of said cushion members disposed between said slide member and a first one of said first and second side walls and a second one of said cushion members disposed between said slide member and a second one of said first and second side walls.

6. A draw bar adapted to mate with a hitch receiver and be secured therein by means of a hitch pin in a mated state, comprising:

(a) a substantially solid, elongated shank having a longitudinal axis and a transversely extending throughway extending therethrough with the throughway having a perimeter wall portion;

(b) a resilient cushion member adapted to be selective mounted into the throughway to define a mounted active state an demounted from the throughway, said cushion member supported against the perimeter wall portion of the throughway when in the active state; and (c) a passageway associated with said cushion member and sized to receive said hitch pin therethrough such that, when in the mated state, longitudinal motion of said shank in said hitch receiver is resisted by said cushion member with a resilient force.

7. A draw bar according to claim 6 including a rigid casing sized and adapted to be received in the throughway, (a) said casing supported against movement in said shank by the first and second side wall portions, and (b) said resilient cushion member received is said casing and supported thereby.

8. A draw bar according to claim 6 including:

(a) a slide member disposed in said throughway and reciprocally movably therein in the longitudinal direction,
   (1) said slide member having a transversely extending bore therethrough that is sized and adapted receive said hitch pin when in the mated state, and (b) said cushion member disposed between said slide member and one of said first and second side wall portions of the throughway.

9. A draw bar according to claim 8 including a pair of cushion members, one of said cushion members disposed between said slide member and a first one of said first and second side wall portions and a second one of said cushion members disposed between said slide member and a second one of said first and second side wall portions.

10. A draw bar adapted to mate with a hitch receiver and be secured therein by means of a hitch pin in a mated state, comprising:

(a) an elongated shank having a longitudinal axis and a transversely extending throughway extending therethrough;

(b) a cartridge adapted to be disposed in the throughway and supported against movement therein;

(c) slide means disposed in said cartridge for reciprocal movement therein in the longitudinal direction,
   (1) said slide member having a transversely extending bore therethrough defining the passageway, the bore being sized and adapted to receive said hitch pin when in the mated state; and (d) cushion means disposed in said cartridge for resiliently resisting relative longitudinal movement of said slide member in said cartridge and therefore said shank in said hitch receiver when in the mated state.

11. A draw bar adapted to mate with a hitch receiver and be secured therein by means of a hitch pin in a mated state, comprising:

(a) an elongated shank having a longitudinal axis and a transversely extending throughway extending therethrough; and (b) at least one cartridge adapted to be disposed in the throughway and supported against movement therein, said cartridge including
   (1) a casing in the form of a rigid sleeve having an axis oriented transversely to the longitudinal direction;
   (2) a resilient cushion member disposed in said casing; and
   (3) a passageway associated with said cushion member and sized to receive said hitch pin therethrough such that, when in the mated state, longitudinal motion of said shank in said hitch receiver is resisted by said cushion member with a resilient force.

12. A draw bar according to claim 11 including:

(a) a slide member disposed in said casing and reciprocally movably therein in the longitudinal direction,
   (1) said slide member having a transversely extending bore therethrough to define the passageway, the bore being sized and adapted to receive said hitch pin when in the mated state, and (b) wherein said casing includes transversely oriented first and second side walls,
   (1) said first and second side walls extending across the interior of said shank in longitudinally spaced relation to one another, and (c) said cushion member disposed between said slide member and one of said first and second side walls.

13. A draw bar according to claim 12 including first and second cushion members, said first cushion member disposed between said slide member and said first side wall and said second cushion member disposed between said slide member and said second side wall.

14. A draw bar according to claim 13 wherein said first and second cushion members have different resiliency characteristics.

15. A draw bar according to claim 14 wherein the different resiliency characteristics are provided by said first and second cushion members being formed of different materials.

16. A draw bar according to claim 14 wherein the different resiliency characteristics are provided by said first and second cushion members having different geometric shapes.

17. A draw bar according to claim 14 wherein the different resiliency characteristics are provided by said first and second cushion members having different constructions.

18. A draw bar according to claim 11 including a hitch ball secured to said shank.

19. A draw bar according to claim 11 including a plurality of interchangeable cartridges adapted to be to be disposed in the opening and supported against movement therein, at least some of said cartridges including:
- (1) a casing in the form of a rigid sleeve having an axis oriented transversely to the longitudinal direction,
- (2) at least one resilient cushion member disposed in said casing; and
- (3) a passageway associated with said cushion member and sized to receive said hitch pin therethrough such that, when in the mated state, longitudinal motion of said shank in said hitch receiver is resisted by said cushion member with a resilient force.

20. A draw bar according to claim 19 wherein at least some of said cartridges including:
- (a) a slide member disposed in said casing and reciprocally movably therein in the longitudinal direction,
  - (1) said slide member having a transversely extending bore therethrough to define the passageway, the bore being sized and adapted to receive said hitch pin when in the mated state, and
- (b) wherein said casing includes transversely oriented first and second side walls,
  - (1) said first and second side walls extending across the interior of said shank in longitudinally spaced relation to one another when positioned in the opening, and
- (c) said cushion member disposed between said slide member and one of said first and second side walls.

21. A draw bar according to claim 20 wherein at least some of said cartridges include first and second cushion members,
- (a) said first cushion member disposed between said slide member and said first side wall, and
- (b) said second cushion member disposed between said slide member and said second side wall.

22. A draw bar according to claim 21 wherein at least one cushion member in at least one cartridge has a different resiliency characteristic than at least one cushion in another of said cartridges.

23. A trailer hitch adapted to mount onto a tractor vehicle in order to interconnect a trailer and the tractor vehicle; comprising:
- (a) a hitch receiver adapted to be secured to the tractor vehicle,
  - (1) said hitch receiver defining longitudinally extending cavity,
  - (2) said hitch receiver including a pair of receiver side walls each having a bore sized for close-fitted engagement by said hitch pin when in a mated state,
    - (i) the bores in said receiver side walls being axially aligned; and
- (b) a draw bar including an elongated shank formed as a hollow tubular member and having a longitudinal axis and a throughway extending transversely therethrough with said throughway having a perimeter wall portion, said throughway being defined by a pair of a opposed axially aligned openings each having a first edge portion and a second edge portion with said first and second edge portion defining at least some of said perimeter wall portion;
- (c) a resilient cushion member immovably disposed in the throughway and supported against at least some of the perimeter wall portion of said shank; and
- (d) a passageway associated with said cushion member and sized to receive said hitch pin therethrough such that, when in the mated state, longitudinal motion of said shank in said hitch receiver is resisted by said cushion member with a resilient force.

24. A draw bar according to claim 23 including a hitch ball secured to said shank.

25. A trailer hitch adapted to mount onto a tractor vehicle in order to interconnect a trailer and the tractor vehicle; comprising:
- (g) a hitch receiver adapted to be secured to the tractor vehicle,
  - (1) said hitch receiver defining a longitudinally extending cavity,
  - (2) said hitch receiver including a pair of receiver side walls each having a bore sized for close-fitted engagement by said hitch pin when in a mated state,
    - (i) the bores in said receiver side walls being axially aligned; and
- (h) a draw bar including an elongated shank having a longitudinal axis and a throughway extending transversely therethrough with said throughway having a perimeter wall portion;
- (i) at least one cartridge adapted to be disposed in the throughway in said shank and supported against movement therein, said cartridge including a casing in the form of a sleeve having an axis oriented transversely to the longitudinal direction;
- (j) a resilient cushion member disposed in said casing and supported against longitudinal movement therein; and
- (k) a passageway associated with said cushion member and sized to receive said hitch pin therethrough such that, when in the mated state, longitudinal motion of said shank in said hitch receiver is resisted by said cushion member with a resilient force.

26. A trailer hitch according to claim 25 wherein
- (d) said casing is in the form of a rigid sleeve having an axis oriented transversely to the longitudinal direction, and
- (e) said shank is formed as a hollow tubular member, said throughway being defined by a pair of opposed axially aligned openings,
  - (1) each opening having a first edge portion and a second edge portion, said first and second edge portions defining said perimeter wall portions, and
- (f) said sleeve supported by said perimeter wall portions.

27. A trailer hitch according to claim 26 including:
- (a) a slide member disposed in said casing and reciprocally movably therein in the longitudinal direction,
  - (1) said slide member having a transversely extending bore therethrough to define the passageway, the bore being sized and adapted to receive said hitch pin when in the mated state, and
- (b) wherein said casing includes transversely oriented first and second side walls,
  - (1) said first and second side walls extending across the interior of said shank in longitudinally spaced relation to one another, and (c) said cushion member disposed between said slide member and one of said first and second side walls.

28. A trailer hitch according to claim 27 including a pair of cushion members, one of said cushion members disposed between said slide member and a first one of said first and second side walls and a second one of said cushion members disposed between said slide member and a second one of said first and second side walls.

29. A method of hitching a trailer to a tractor vehicle, comprising:
  (a) placing a hitch receiver on said tractor vehicle,
     (1) said hitch receiver defining a longitudinally extending cavity,
     (2) said hitch receiver including a pair of side walls each having a bore sized for close-fitted engagement by said hitch pin when in a mated state,
     (i) the bores in said side walls being transversely aligned;
  (b) providing a draw bar including
     (1) an elongated shank having a longitudinal axis and a transversely extending throughway extending therethrough;
  (c) providing at least one cartridge adapted to be disposed in the throughway and supported against movement therein;
  (d) interconnecting said hitch receiver and said draw bar with a hitch pin in such a manner that the hitch pin is resiliently cushioned relative to said cartridge; and
  (e) attaching a tongue of the trailer to the draw bar.

* * * * *

UNITED STATES PATENT AND TRADEMARK OFFICE
CERTIFICATE OF CORRECTION

PATENT NO.    : 6,581,953 B1
DATED         : June 24, 2003
INVENTOR(S)   : Smith R. Jerry It is certified that error appears in the above-identified patent and that said Letters Patent is hereby corrected as shown below:

<u>Title page,</u>
Item [76], inventors name, "Smith R. Jerry", should read -- Jerry R. Smith --

Signed and Sealed this

Ninth Day of December, 2003

JAMES E. ROGAN
*Director of the United States Patent and Trademark Office*